United States Patent [19]
Cheng

[11] Patent Number: 5,314,241
[45] Date of Patent: May 24, 1994

[54] HANDCART WHEEL-MOUNTING APPARATUS

[76] Inventor: Chin-Chang Cheng, No. 20, Lane 327, Sec. 2, Chung Shan Rd., Chung Ho City, Taipei Hsien, Taiwan

[21] Appl. No.: 109,685

[22] Filed: Aug. 20, 1993

[51] Int. Cl.⁵ .............................................. B60B 37/00
[52] U.S. Cl. ................................... 301/111; 301/119; 301/121
[58] Field of Search ............... 301/111, 118, 119, 121, 301/113, 122; 403/83, 91, 92, 93, 109, DIG. 4

[56] References Cited

U.S. PATENT DOCUMENTS

| | | | |
|---|---|---|---|
| 4,043,685 | 8/1977 | Hyams | 301/121 X |
| 4,679,862 | 7/1987 | Luo | 301/122 X |

FOREIGN PATENT DOCUMENTS

| | | | |
|---|---|---|---|
| 166001 | 1/1905 | Fed. Rep. of Germany | 301/119 |
| 1917335 | 12/1969 | Fed. Rep. of Germany | 301/121 |
| 284493 | 2/1928 | United Kingdom | 301/121 |
| 707183 | 4/1954 | United Kingdom | 301/120 |

*Primary Examiner*—Russell D. Stormer
*Attorney, Agent, or Firm*—Peterson, Wicks, Nemer & Kamrath

[57] ABSTRACT

A handcart wheel-mounting apparatus includes a wheel mounted by means of a number of latches each biased by means of an elastic element, on a hub member in turn mounted by means of an annular washer and a cap, on a wheel shaft mounted on a wheel support. The hub member comprises a rim, an axial bore formed therethrough, a tubular bearing coaxially formed therethrough about the axial bore, a plurality of recesses formed therein about the axial bore, and a plurality of holes radially formed therethrough so that each of the holes communicates with a corresponding one of said recesses. A number of elastic elements are received in the recesses. A number of latches each are formed on a corresponding one of the elastic elements and the latches are biased through the holes by means of the elastic elements. The wheel shaft is inserted through a passage formed transversely through the wheel support, the annular washer, and the axial bore. Then, a tip of the wheel shaft is firmly fitted in the cap. Thus, the hub member is firmly mounted on the wheel shaft. The wheel is co-axially formed with a tubular portion and a number of sockets are transversely formed through the tubular portion. The hub member is mounted in the tubular portion having the holes aligned with the sockets. Then, the latches are inserted through the holes into the sockets. Thus, the wheel is mounted on the hub member.

3 Claims, 5 Drawing Sheets

HANDCART WHEEL-MOUNTING APPARATUS

BACKGROUND OF THE INVENTION

1. Field of the Invention

The present invention relates to a handcart wheel-mounting apparatus.

2. Related Prior Art

Handcarts are useful vehicles for carrying objects. The most important part for the handcarts is the wheel-mounting structure which concerns the safety and stability of the handcarts. Trouble may arise if the wheel structure is not securely assembled, especially on irregular ground.

Conventional wheel-mounting structures of handcarts are unstable, so the structures are limited to carry smaller loads due to instability.

Moreover, the conventional wheel-mounting structures are sometimes likely to scratch human bodies, and are apt to tangle with objects such as clothing, baggage and the like.

The present invention provides a safe handcart wheel-mounting structure without any projecting configuration and so avoids scratching human bodies and tangling with objects such as clothing, baggage and the like.

Moreover, the handcart wheel-mounting apparatus is easy to be assembled and dismantled and is so stable that it can carry larger loads with bigger wheels.

SUMMARY OF THE INVENTION

The present invention provides a handcart wheel-mounting apparatus which includes a wheel mounted by means of a number of latches each biased by means of an elastic element, on a hub member in turn mounted by means of an annular washer and a cap, on a wheel shaft mounted on a wheel support.

The hub member defines a rim, an axial bore formed therethrough, a tubular bearing co-axially formed therethrough about the axial bore, a plurality of recesses formed therein about the axial bore, and a number of holes radially formed therethrough so that each of the holes communicates with a corresponding one of the recesses.

A plurality of elastic elements are received in the recesses. A number of latches each are formed on a corresponding one of the elastic elements and the latches are biased through the holes by means of the elastic elements.

The wheel shaft is inserted through a passage formed transversely through the wheel support, the annular washer, and the axial bore. Then, a tip of the wheel shaft is firmly fitted in the cap. Thus, the hub member is firmly mounted on the wheel shaft.

The wheel is co-axially formed with a tubular portion and a number of sockets are transversely formed through the tubular portion. The hub member is mounted in the tubular portion having the holes aligned with the sockets. Then, the latches are inserted through the holes into the sockets. Thus, the wheel is mounted on the hub member.

By such an arrangement, the handcart wheel-mounting apparatus in accordance with the present invention provides a safe wheel-mounting structure without any projecting configuration and so avoids scratching human bodies and tangling with objects such as clothing, baggage and the like.

Moreover, the handcart wheel-mounting apparatus is easy to be assembled and dismantled and is very stable so that it can carry larger loadings with bigger wheels.

DETAILED DESCRIPTION OF THE PREFERRED EMBODIMENTS

Figure 4:
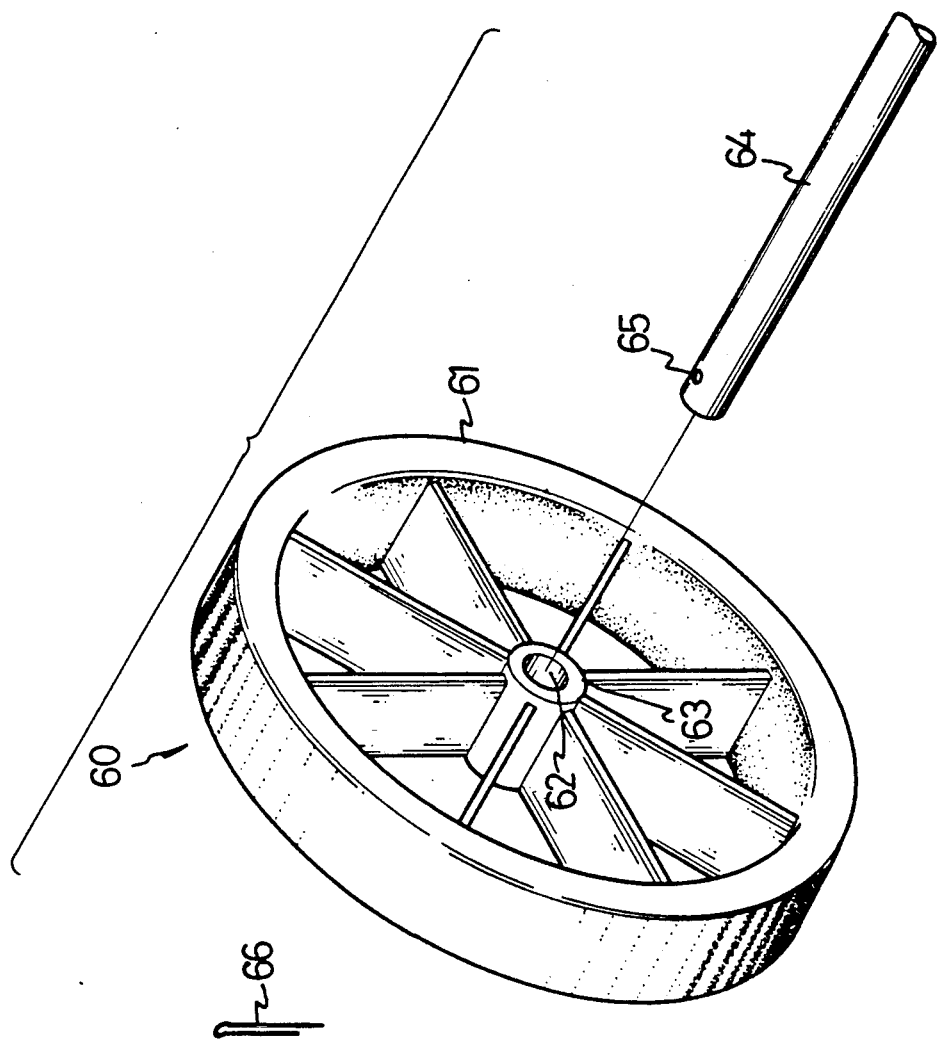
FIG. 4 is an exploded view of a structure in accordance with a first type of conventional wheel-mounting apparatus.
Figure 5:
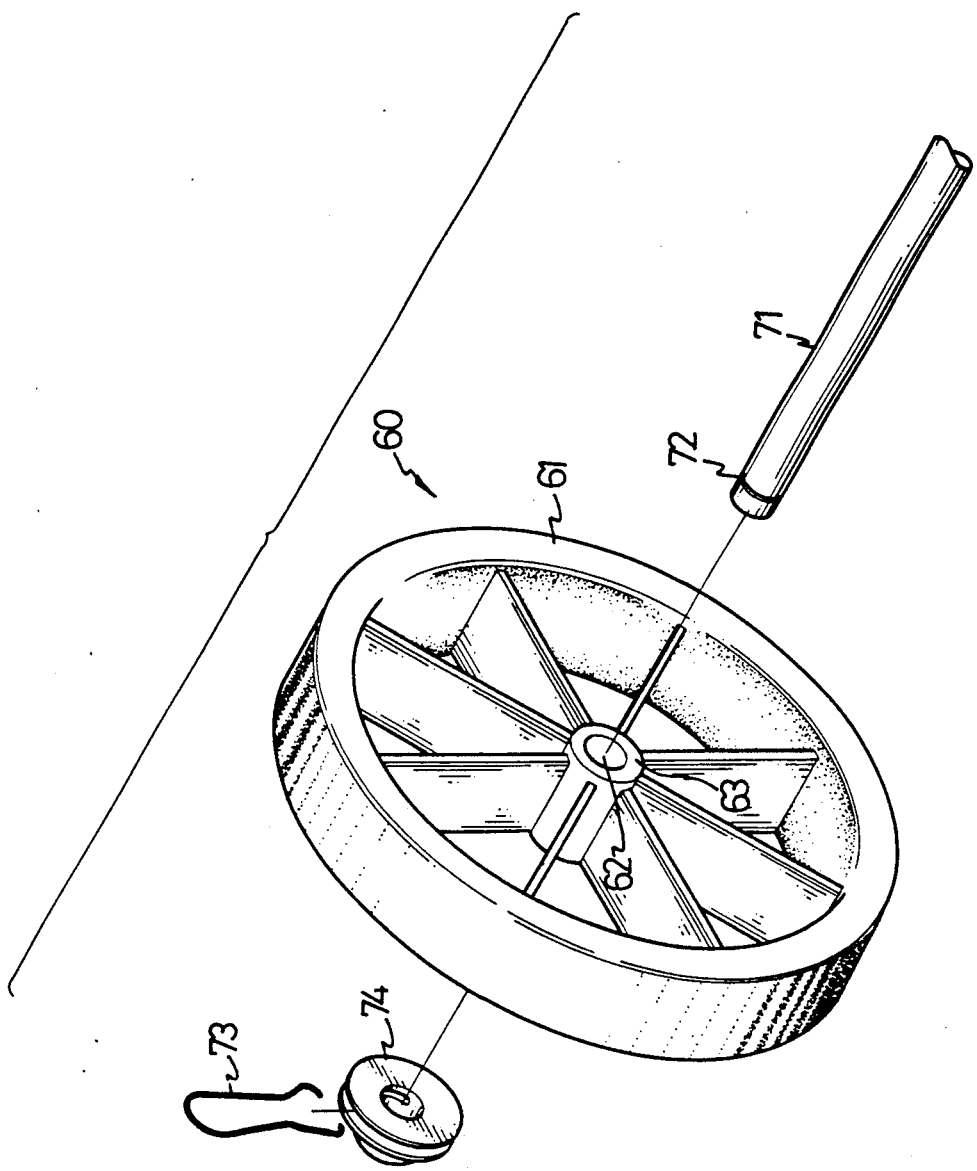
FIG. 5 is an exploded view of a structure in accordance with a second type of conventional wheel-mounting apparatus.

For a better understanding of the features and benefits of the present invention, reference is made to FIGS. 4 and 5 illustrating two handcart wheel-mounting devices in accordance with the prior art.

Referring to FIG. 4, a wheel 61 is co-axially formed with a hub 63 by means of a number of spokes radially protruding from the hub 63 to a rim 61 of the wheel 60. The hub 63 has an axial bore 62 therethrough.

A wheel shaft 64 has a passage 65 formed transversely therethrough. The wheel shaft 64 is inserted through the axial bore 62 with the passage 65 disposed outside the hub 63 so that a pin 60 can be locked into the passage 65, i.e., the wheel 61 is firmly mounted on the wheel shaft 64.

However, such a handcart wheel-mounting structure is unstable because the pin 60 easily disengages with the passage 65, especially on irregular ground. So, the structure is limited to carry smaller loads due to its instability. Moreover, the pin 66 has a sharp end so that it is likely to scratch human bodies. Furthermore, the pin 60 is apt to tangle with objects such as clothing, baggage and the like.

Referring to FIG. 5, an improved structure is made. A wheel 60 is formed with a hub 63 provided with an axial bore 62, and a rim 61 identical to those illustrated in FIG. 4. A wheel shaft 71 defining an annular groove 72 therein is inserted through the axial bore 62 with the annular groove 72 disposed outside the hub 63.

A cap 74 defines a central recess therein and two slots formed therethrough so that the central recess communicates with the slots. The wheel shaft 71 is further inserted in the central recess formed in the cap 74 so that the annular groove 72 aligns with the slots formed in the cap 74.

A pin 73 has two feet each having a locking portion with a minimum distance between each other. The pin 73 is mounted on the cap 74 so that the locking portions thereof are inserted through the slots formed in the cap 74 and are further received in the annular groove 72. Thus, the wheel 61 is firmly mounted on the wheel shaft 71.

However, it is not easy to push the pin 73 on the cap 74. Moreover, if the annular groove 72 is shallow, the pin 73 is likely to be disengaged therefrom, i.e., the wheel 61 is likely to be disengaged from the wheel shaft 71.

Figure 1:
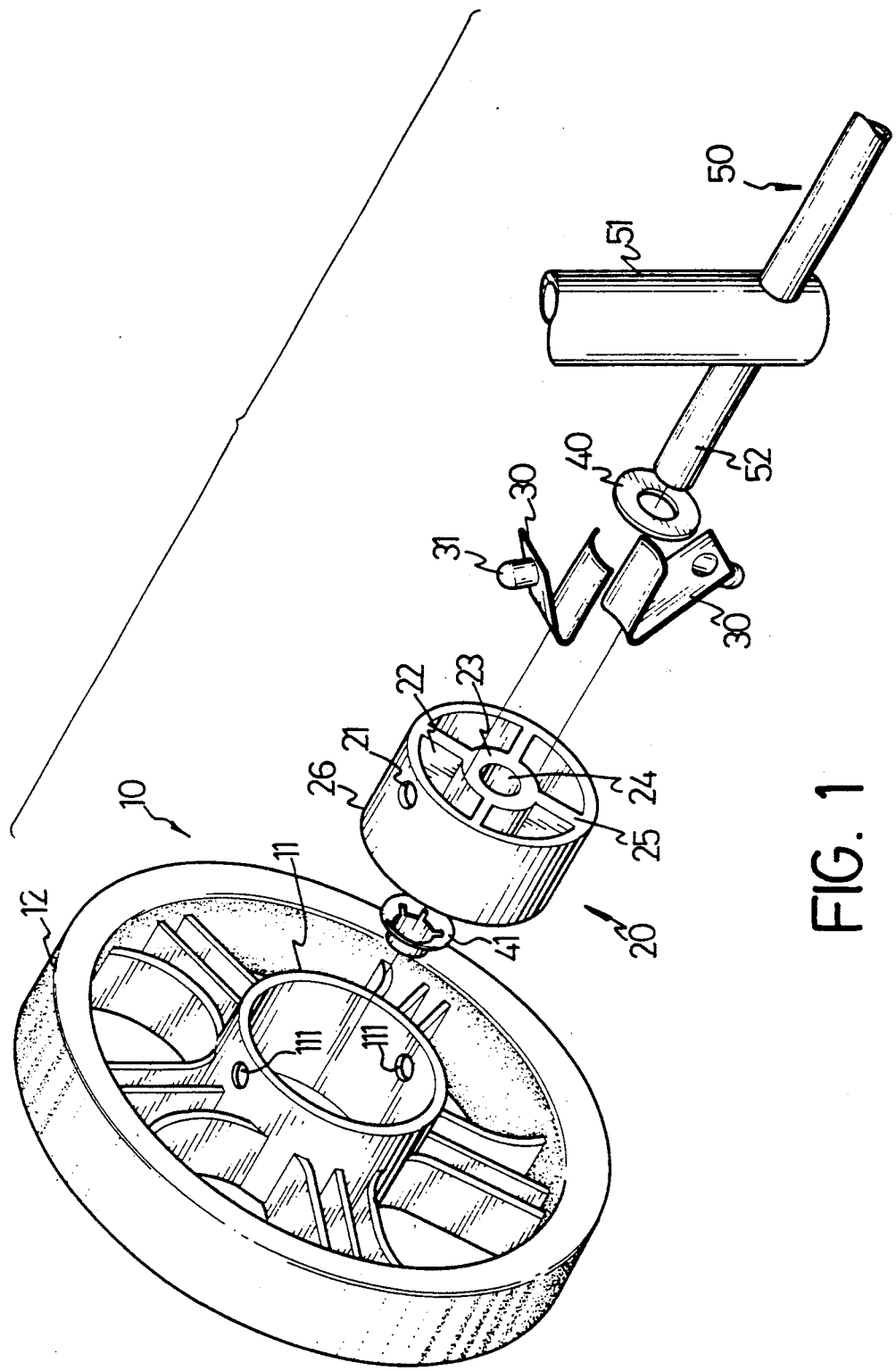
FIG. 1 is an exploded view of a handcart wheel-mounting apparatus including a tubular hub member and a wheel in accordance with the present invention.
Figure 2:
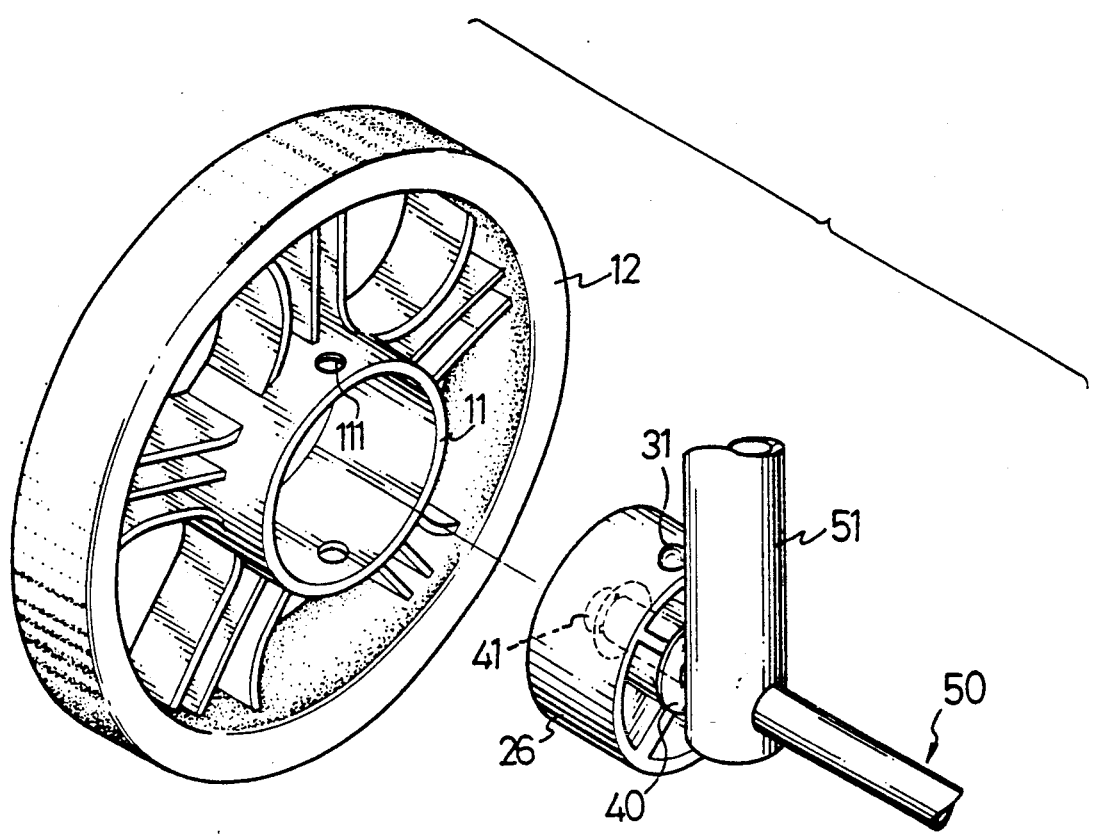
FIG. 2 is a perspective view of the wheel-mounting apparatus as shown in FIG. 1, showing the hub member mounted on a wheel shaft.
Figure 3:
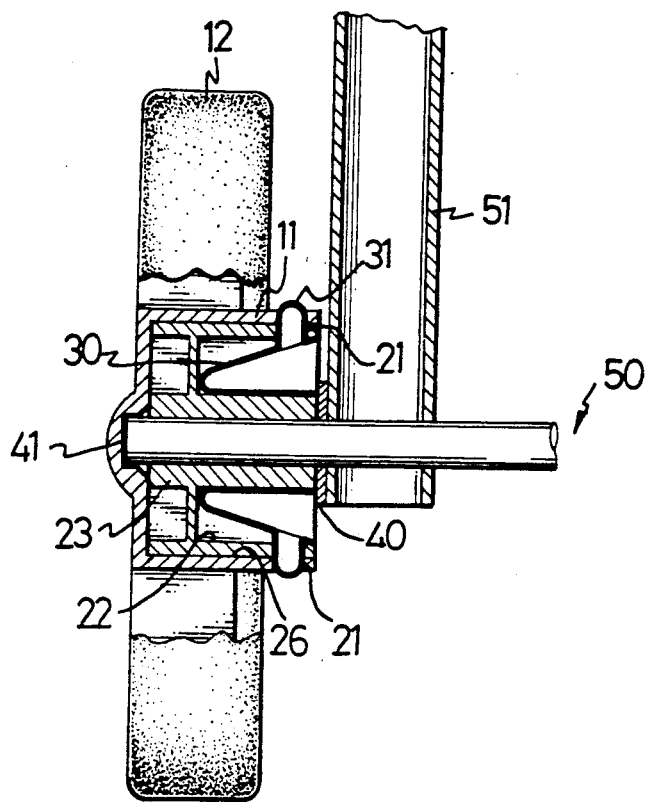
FIG. 3 is a cross-sectional view of the wheel-mounting apparatus as shown in FIG. 1, showing the hub member mounted between the wheel and the wheel shaft.

Referring to FIGS. 1-3, a handcart wheel-mounting apparatus in accordance with the present invention includes a wheel 10 mounted by means of a number of latches 31 each biased by means of an elastic element 30, on a tubular hub member 20 in turn mounted by means of an annular washer 40 and a cap 41, on a wheel shaft 50 mounted on a wheel support 51.

The tubular hub member 20 is co-axially formed with a tubular bearing 23 by means of four ribs 25 radially extending from the tubular bearing 23 to a rim 26 of the tubular hub member 20. Thus, a space formed between the rim 26 of hub member 20 and the tubular bearing 23 is separated into four recesses 22 by means of the ribs 25. The tubular bearing 23 defines an axial bore 24 therethrough.

There are two holes 21 formed transversely through the rim 26 so that they communicate with two of the recesses 22 which are diametrically opposite to each other.

Two elastic elements 30 have a V-shaped configuration, i.e., each of the elastic elements 30 has a first section and a second section with an angle therebetween. The first section of each of the elastic elements 30 has a latch 31 protruding therefrom. The second section is longitudinally formed arc-shaped to match the tubular bearing.

The two elastic elements 30 are respectively received in two of the recesses 22 so that the latches 31 are biased through the holes 21 by means of the elastic elements 30.

A wheel shaft 50 is inserted through a passage formed transversely through the wheel support 51, an annular washer 40 and the axial bore 24. Then, a tip 52 of the wheel shaft 50 is firmly fitted in a cap 41, thus, the tubular hub member 20 is firmly mounted on the wheel shaft 50 as shown in FIG. 2 of the drawings.

Furthermore, the wheel 10 is co-axially formed with a tubular portion 11 by means of a number of spokes radially protruding from the tubular portion 11 to a rim 12. Two sockets 111 are transversely formed through the tubular portion 11.

To mount the wheel 10 on the tubular hub member 20, the first sections of the elastic members 30 are pressed towards each other in order to locate the latches 31 in the holes 21. The tubular hub member 20 can thus be mounted in the tubular portion 11. The holes 21 are then aligned with the sockets 111 so that the latches 31 are inserted through the holes 21 into the sockets 111 when the first sections of the elastic elements 30 are released. Therefore, the wheel 10 is mounted on the tubular hub member 20.

It should be clear to those skilled in the art that further embodiments of the present invention may be made without departing from the teachings of the present invention.

I claim:

1. A handcart wheel-mounting apparatus comprising:

a hub member comprising an axial bore formed therethrough, a tubular bearing co-axially formed therethrough about said axial bore, a plurality of recesses formed therein about said axial bore, and a plurality of holes radially formed therethrough so that each of said holes communicates with a corresponding one of said recesses;

a number of elastic elements received in said recesses;

a number of latches each formed on a corresponding one of said elastic elements, said latches biased through said holes by means of said elastic elements;

a wheel shaft inserted through a passage formed transversely through a wheel support, a washer, and said axial bore, a tip of said wheel shaft being firmly fitted in a cap so that said hub member can be firmly mounted on said wheel shaft; and a wheel co-axially formed with a tubular portion through which a number of sockets is transversely formed, said hub member being mounted in said tubular portion, having said holes aligned with said sockets so that said latches can be inserted through said holes into said sockets, thus, said wheel being mounted on said hub member.

2. The handcart wheel-mounting apparatus in accordance with claim 1, wherein said elastic elements have a V-shaped configuration, each of said elastic elements having a first section and a second section, a corresponding latch integrally molded into said first section and protruding therefrom.

3. The handcart wheel-mounting apparatus in accordance with claim 2, wherein said second section is longitudinally formed arc-shaped to match said tubular bearing.

* * * * *